United States Patent [19]

Meijer

[11] 4,030,404

[45] June 21, 1977

[54] SWASH-PLATE DRIVE MECHANISM

[75] Inventor: Roelf Jan Meijer, Eindhoven, Netherlands

[73] Assignee: U.S. Philips Corporation, New York, N.Y.

[22] Filed: Aug. 4, 1975

[21] Appl. No.: 601,463

[30] Foreign Application Priority Data

Aug. 6, 1974 Netherlands .................... 7410532

[52] U.S. Cl. .................... 92/12.2; 60/525; 91/505; 91/506; 92/13.1; 92/13.3; 92/71; 92/147; 417/269

[51] Int. Cl.² .................... F01B 3/00; F01B 13/04

[58] Field of Search .............. 92/12.2, 13.1, 13.3, 92/71, 147; 91/505, 506; 60/525, 517, 526; 417/270, 269

[56] References Cited

UNITED STATES PATENTS

| 1,879,563 | 9/1932 | Smith | 60/525 |
|---|---|---|---|
| 2,480,525 | 8/1949 | Van Weenen | 60/525 |
| 2,840,066 | 6/1958 | Morris | 92/13.1 |
| 3,106,057 | 10/1963 | Manning | 91/506 |
| 3,175,363 | 3/1965 | Molly | 91/506 |
| 3,292,554 | 12/1966 | Hessler | 91/506 |
| 3,319,874 | 5/1967 | Welsh | 92/12.2 |
| 3,397,619 | 8/1968 | Sturtevant | 92/12.2 |
| 3,665,814 | 5/1972 | Ankeny | 92/71 |
| 3,733,963 | 5/1973 | Kubilos | 91/506 |
| 3,921,503 | 11/1975 | Kubik | 91/506 |

*Primary Examiner*—Martin P. Schwadron
*Assistant Examiner*—Abraham Hershkovitz
*Attorney, Agent, or Firm*—Frank R. Trifari; David R. Treacy

[57] ABSTRACT

A device comprising at least three reciprocable piston-shaped bodies, each of which is provided with a drive rod which cooperates, via a drive rod head accommodating sliding bodies, with a plate which is mounted on a rotatable shaft and which can be tilted about a tilting axis which is transverse to the center line of the shaft. The means for tilting the plate are formed by piston-shaped bodies which can rotate with the shaft and which can be adjusted in the direction of the shaft, the first of the said bodies being coupled to the plate on the one side of the tilting axis, the other body being coupled to the plate on the other side of the tilting axis. Each of the said piston-shaped bodies bounds a space whereto pressurized liquid can be applied, the masses of the said piston-shaped bodies also serving for balancing the unbalancing forces occurring during operation.

4 Claims, 7 Drawing Figures

SWASH-PLATE DRIVE MECHANISM

BACKGROUND OF THE INVENTION

The invention relates to a drive mechanism comprising at least three reciprocable pistons, each of which is provided with a drive rod which cooperates, via a drive rod head incorporating sliding bodies, with a plate which is mounted on a shaft which is rotatably journalled in the device. This plate is precluded from rotary movement with respect to the shaft, but can be tilted about a tilting axis which is transverse to the centre line of the shaft, and further means are provided for tilting the plate.

Drive mechanism of the kind forming the subject of the present invention are known in the technique as swashplate drives, which are particularly suitable for use in hot-gas reciprocating machines, pumps and compressors. The drive converts the reciprocating movement of the pistons into a rotary movement of the plate and the shaft connected thereto, or vice versa. The stroke of the pistons is determined by the distance between the drive rods and the shaft and by the angle enclosed by the plate and the shaft.

By tilting the plate about the tilting axis, the angle enclosed by the plate and the shaft is varied, and in this comparatively simple manner the stroke of the pistons can be varied. Thus, the power delivered by engines can be adjusted and the yield of pumps and compressors can be varied.

U.S. Pat. No. 3,511,102 describes a hot-gas engine whose power can be controlled by tilting the plate with which the pistons cooperate more or less. The tilting of the plate is effected by means of mechanical means, which makes the entire adjusting mechanism complex. The invention has for its object to provide a device of the kind set forth, wherein the adjustment of the plate is effected in a simpler manner.

SUMMARY OF THE INVENTION

This invention is characterized in that the means for tilting the plate are formed by pistons which can rotate with the shaft and which are adjustable in the direction of the shaft. The first piston is coupled to the plate on one side of the tilting axis and the other piston is coupled to the plate on the other side of the tilting axis. Each of the pistons bounds a space to which liquid can be applied under pressure, each of the pistons and the coupling rod and further parts possibly connected thereto have a centre of gravity which is situated on the same side of the plane through the centre line of the shaft and the tilting axis as the coupling between the said body and the plate. There is an overall centre of gravity of one piston and the parts connected thereto and the part of the plate which is situated on the same side of the plane through the centre line of the shaft and the tilting axis as the coupling between the relevant piston and the plate, and an overall centre of gravity of the other piston and parts connected thereto and the part of the plate which is situated on the other side of the plane through the centre line of the shaft and the tilting axis. In the situation wherein the plate is perpendicular to the shaft, both centers of gravity are situated in a plane which is either perpendicular to the shaft or which encloses an angle with the said plane perpendicular to the shaft, the angle being situated on the side of the plane other than the side on which the angle over which the plate can be adjusted with respect to the plane perpendicular to the shaft through the tilting axis, is situated. By means of liquid pressure, the pistons can be moved against the pressure which is caused by the piston forces acting on the plate via the sliding bodies.

It is an advantage of this construction that the liquid pressure can be very simply chosen to be such that it is dependent of the number of revolutions of the device. For example, if the device is formed by an engine, the liquid pressure can be controlled, for example, such that the curve of the torque as a function of the number of revolutions is hyperbolic, this is very advantageous for traction purposes. It is also possible to obtain a torque/number of revolutions curve according to a constant yield of the engine. It appears that the adjusting device offers a high degree of freedom as regards the control of the relevant device.

As will be described in detail hereinafter, the device according to the invention also offers the possibility of achieving very good balancing.

In known constructions the thickness of the plate is selected for balancing purposes such that the mass inertia forces of the reciprocating parts are balanced. Generally, the thickness of the plate is substantially larger than necessary for considerations of strength. It is a drawback that the entire drive and hence the device are then larger than necessary.

In order to eliminate these drawbacks, it has been proposed to provide the device with a thinner plate incombination with balancing masses which are arranged on the shaft on both sides of the plate, as contrasted with a thicker plate of the prior art. Such a balancing can be used only in a drive where the plate occupies a fixed position with respect to the shaft. It has also been proposed to use a thin plate, in which case a balancing ring of a material having a high specific weight is provided in the edge of the plate.

In the device according to the invention, the two pistons can be arranged on both sides of the plate such that at an angle of 90° between the plate and the shaft, the centres of gravity of the two pistons are arranged to be diametrically opposite each other. In this position, therefore, no torque will be exerted by the two pistons. When the plate is tilted, the pistons increasingly move further apart in the axial direction, the torque then occurring continuously increasing. This torque can then very well balance the increasing mass inertia forces of the reciprocating parts. However, complete balancing, apart from the balancing occurring in a position of the plate perpendicular to the shaft, is possible only for one further given position of the plate. This is due to the fact that the mass inertia torques vary with the product of sin $x$ cosine of the angle between the plate and the shaft, while the balancing torque of the pistons and everything connected thereto varies as the sine of said angle. In given circumstances it may, therefore, be desirable to situate the two overall centres of gravity of the pistons on both sides of the shaft such that in the situation wherein the plate is perpendicular to the shaft, both centres are not situated in a plane perpendicular to the shaft, but rather in a plate which encloses an angle with said plate. The angle is then situated on the side of the plate other than the side on which the adjusting angle of the plate is situated. This means that in the position wherein the plate is perpendicular to the shaft, so that no reciprocating movement of the pistons occurs, a small torque still occurs. Upon adjustment of the plate, this torque initially decreases, passes through zero at a given instant, and subsequently starts to increase in the other direction. This will be described in detail hereinafter with reference to the Figures.

A further embodiment of the device according to the invention is characterized in that pistons are arranged to be slidable on the shaft on both sides of the plate. Each piston is constructed such that the centre of gravity of each piston is situated on the same side of the tilting axis as the coupling between the relevant piston and the plate; each of the pistons is furthermore connected to a weight which is situated on the side of the plate other than the side on which the relevant piston is situated.

In a further preferred embodiment yet, each of the weights is also constructed as a piston which is slidable on the shaft and which, together with the piston situated on the same side of the plate, and encloses a space whereto and wherefrom liquid can be applied and discharged. As a result, an increased effective piston surface is obtained, so that either the construction may be more compact or a lower liquid pressure may be used.

The invention will be described in detail hereinafter with reference to the drawing.

DETAILED DESCRIPTION OF THE PREFERRED EMBODIMENT

Figure 1:
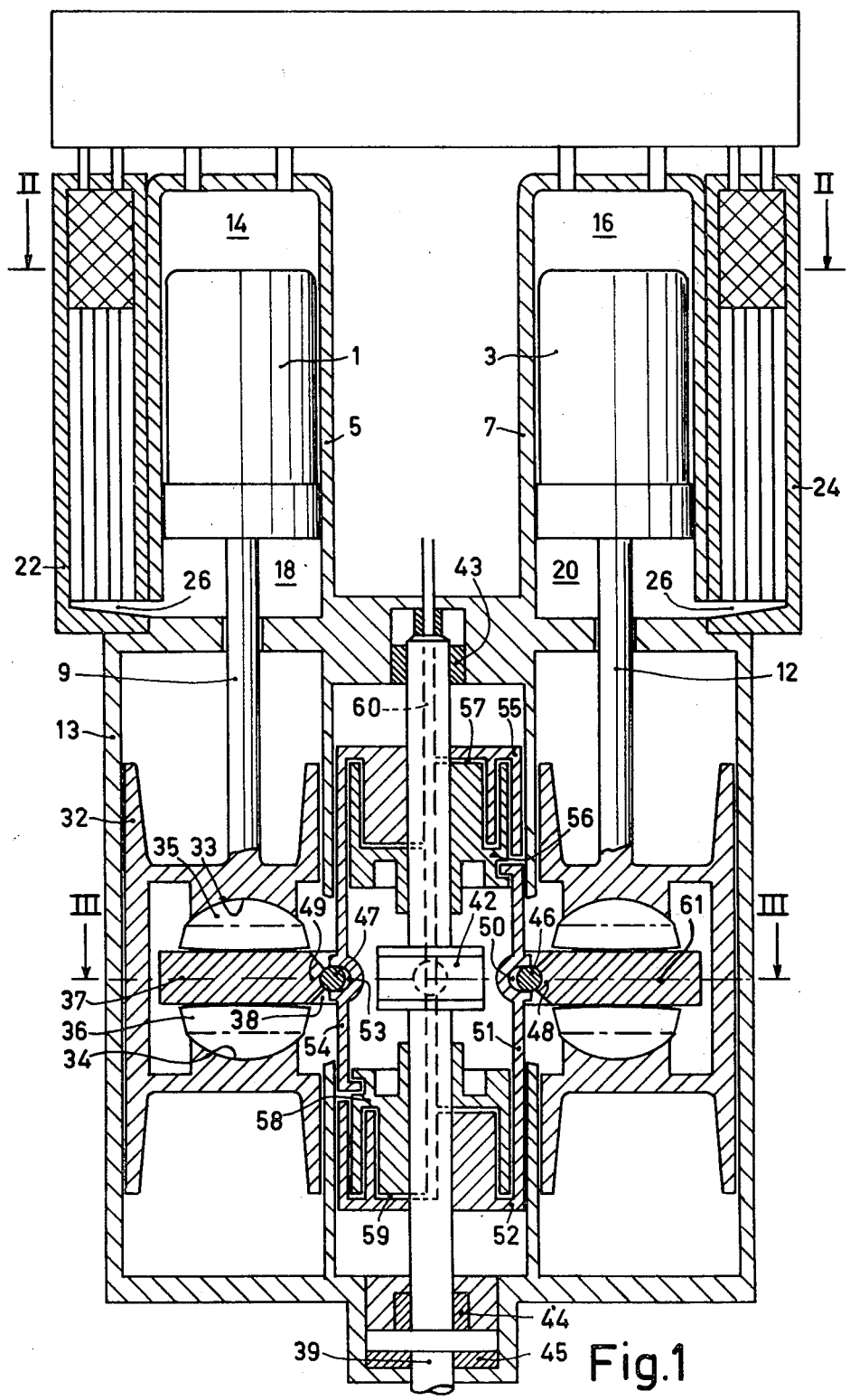
FIG. 1 is an elevation view in section of a hot gas engine.
Figure 2:
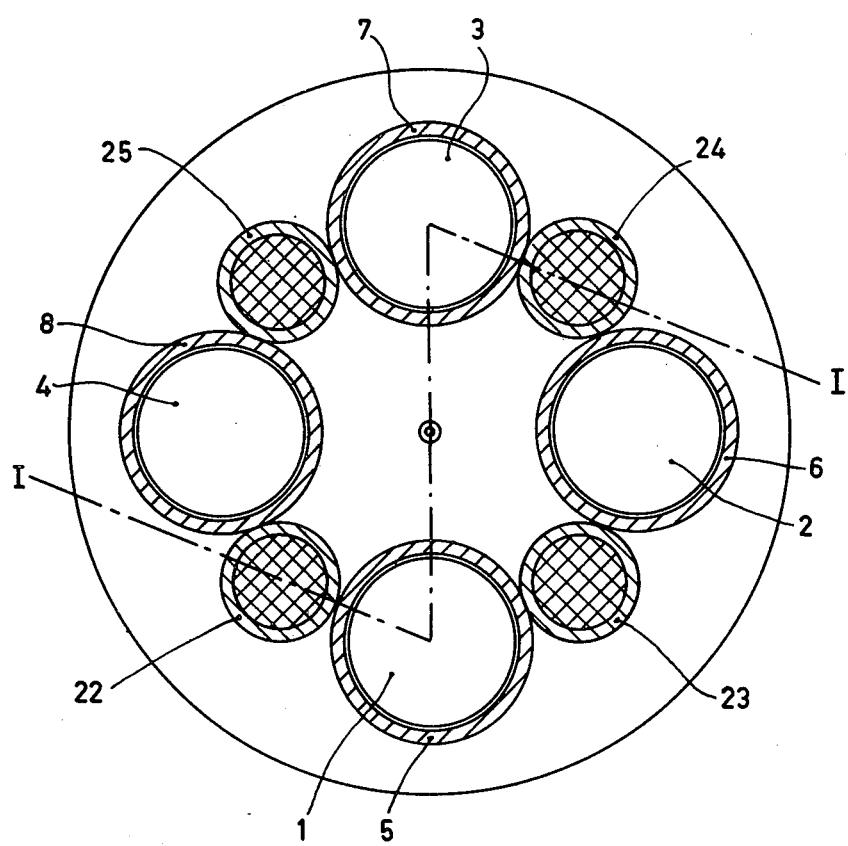
FIG. 2 is a sectional view taken along line II—II in FIG. 1.
Figure 3:
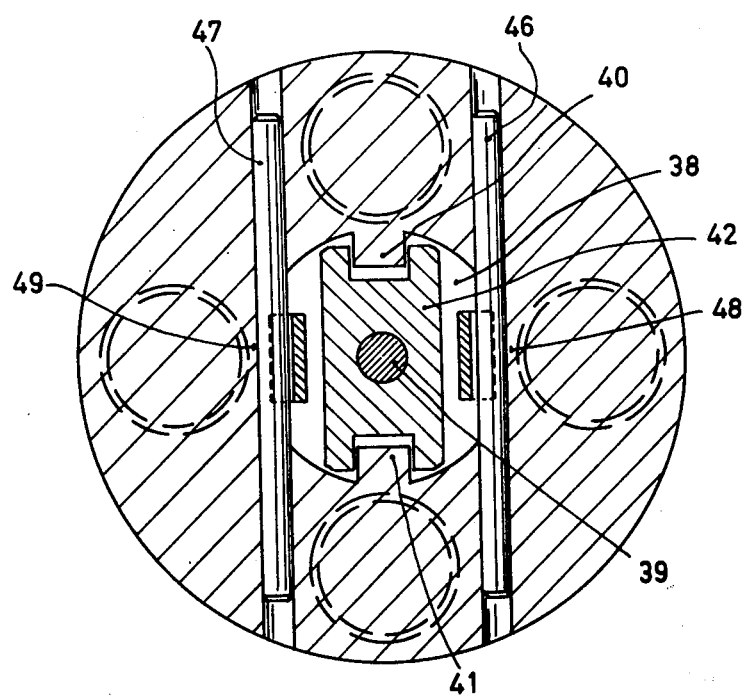
FIG. 3 is a sectional view taken along line III—III in FIG. 1.

This hot-gas engine comprises four double-acting pistons 1, 2, 3 and 4 which are accommodated in four cylinders 5, 6, 7 and 8. Each of the pistons 1, 2, 3 and 4 is provided with a drive rod 9, 10, 11 and 12 which is passed in a sealed manner through the closed lower ends of the cylinders to a drive arranged in a housing 13.

In each cylinder the pistons 1, 2, 3 and 4 separate a higher-temperature space 14, 15, 16 and 17 from a lower-temperature space 18, 19, 20 and 21. Between the cylinders 5, 6, 7 and 8 an equal number of units 22, 23, 24 and 25 are arranged, each comprising a cooler and a regenerator.

On the cooler side, the units 22, 23, 24 and 25 are connected to the cylinders 5, 6, 7 and 8 via ducts 26. A four cylinder double-acting hot-gas engine is thus provided, the principle thereof being described in Netherlands Pat. No. 65813; consequently this engine will not be elaborated herein.

Each of the drive rods 9, 10, 11 and 12 is provided with a drive rod head 32 which is provided with two bowl-shaped recesses 33 and 34 wherein sliding bodies 35 and 36 are journalled, the flat sides thereof cooperating with an intermediate plate 37.

The plate 37, provided with a hole 38 in its centre, is arranged about a shaft 39 and is journalled, by way of two cylindrical trunnions 40, 41, in a block 42 which is rigidly connected to the shaft 39. In this manner, the plate 37 is not capable of rotation about the shaft 39, but can be tilted about the centre line of the trunnions 40, 41. The shaft 39 is journalled in the housing at the areas 43, 44 and 45.

The plate 37 is furthermore provided with two pins 46 and 47 which are arranged in a bore in the plate and which are clear from the plate at the area of the hole 38, the pins being supported on one side by a portion 48 and 49, respectively, of the plate.

The pin 46 is journalled on the other side in a recess 50 of a portion 51 which is connected to a piston 52 which is slidable over the shaft 39. The pin 47 is journalled in the same manner in a recess 53 of a portion 54 which is connected to a piston 55 which is slidable over the shaft 39, the piston 55 being situated on the side of the plate 37 other than the side on which the piston 52, is situated.

The pistons 52 and 55 are constructed such that their centres of gravity are situated besides the centre line of the shaft 39, i.e. on the same side as the coupling 50, 51, 46 and 53, 54, 47 respectively, between the relevant piston and the plate 37.

Instead of the described pin-slot coupling between the pistons and the plate, use can alternatively be made of a coupling comprising two gear-wheel segments or a gearwheel segment and a rack segment. The portion 51 of the piston 52 is furthermore connected to a piston 56 which is arranged to be slidable on the shaft 39 on the same side of the plate 37 as the piston 55.

The pistons 55 and 56 are then constructed such that the ends thereof which face each other can slide one into the other so that they bound a space 57 of variable volume. The piston 56 is constructed such that the centre of gravity thereof is situated in the same plane through the centre line of the shaft 39 as the centre of gravity of the piston 52, their common centre of gravity being situated in the central plane 61 of the plate 37.

Similarly, the portion 54 of the piston 55 is connected to a piston 58 which is situated on the same side of the plate 39 as the piston 52. A space 59 of variable volume is present between the pistons 52 and 58. Furthermore, the masses and the location of the pistons 52 and 58 are again chosen such that their common centre of gravity is again situated in the central plane 61 of the plate 37, but on the side of the tilting axis 40-41 other than the side on which the centre of gravity of the combination of the pistons 55 and 56, is situated. Pressurized liquid can be applied to the spaces 57 and 59, via a duct 60 in the shaft 39, by means of a pumping device which is not shown in the drawing.

The operation of a hot-gas engine as such is known, so it need not be described herein.

The movement of the pistons 1, 2, 3 and 4 is converted, via the drive rods etc. and the plate 37, into a rotary movement of the shaft 39. The stroke of the pistons 1, 2, 3 and 4 is determined by the angle enclosed by the plate 37 and the shaft 39. Therefore, the stroke and hence the power delivered by the engine can be varied by varying this angle.

In the device shown in the drawing, the angle is varied by applying liquid, via duct 60, to the spaces 57 and 59. In the situation shown in FIG. 1, wherein the plate 37 is perpendicular to the shaft 39 so that the piston excursion is zero, the pistons 55, 56 and 52, 58 will move away from each other when liquid is applied to the spaces 57 and 59. As a result, the pin 46 moves downwards along with the piston 52, and the pin 47 moves upwards along with the piston 55.

Figure 4:
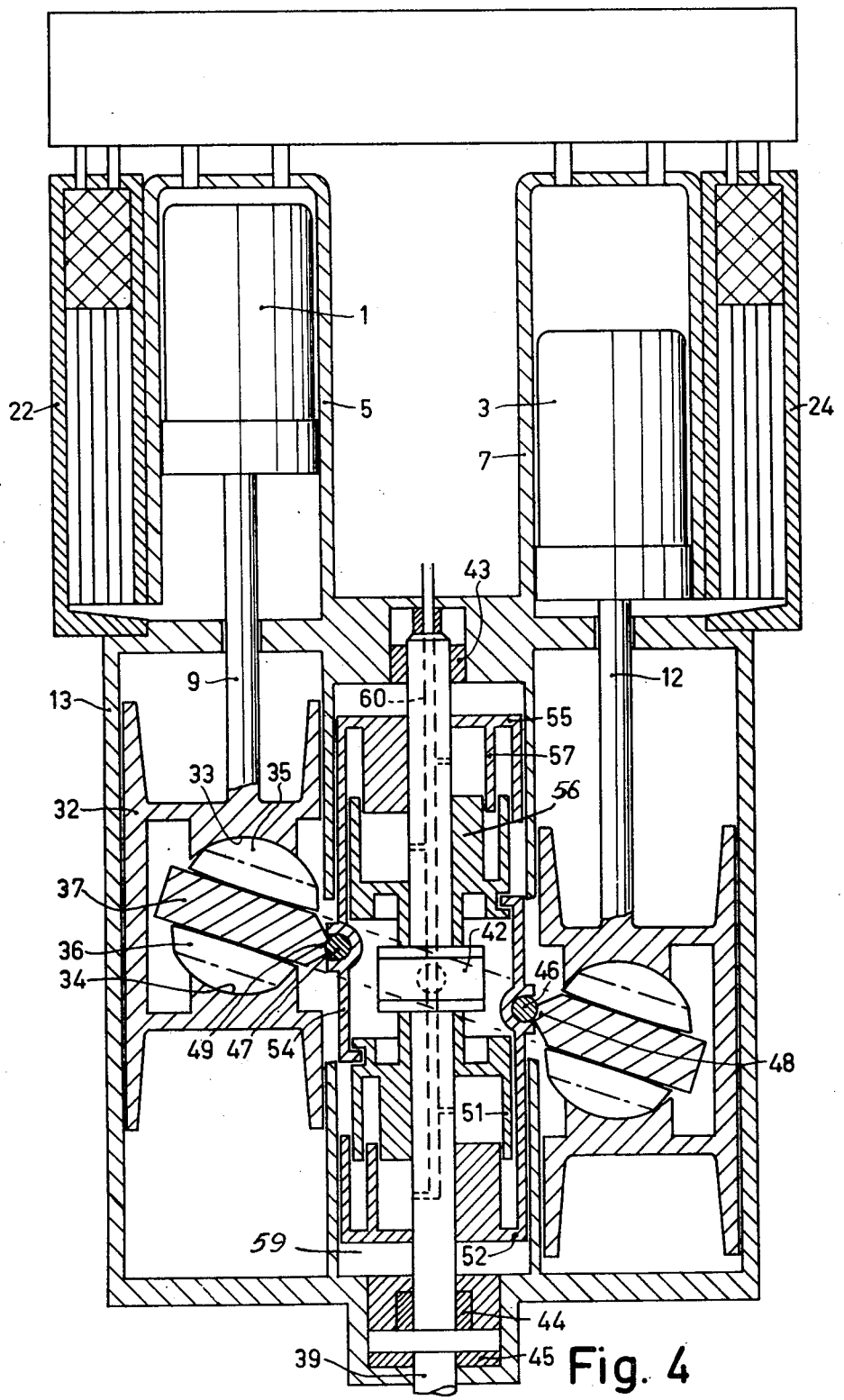
FIG. 4 is similar to FIG. 1, with the swash plate tilted.

In this manner the plate 37 is tilted until the position of plate 37 shown in FIG. 4 is reached. If the discharge of liquid from the spaces 57 and 59 is released at a later stage, the forces exerted on the plate 37 by the drive rods will cause the plate 37 to return to its position in which it encloses an angle of 90° with the shaft.

A simple adjusting mechanism for the plate 37 is thus obtained. The control of the liquid to and from the spaces 57 and 59 can be effected in various manners, for example, by means of a regulator which responds to the engine speed or by means of a regulator which is controlled by a combination of the engine speed and the pressure in the working spaces; it is alternatively possible to control the supply and the discharge of the liquid by means of the "gas pedal."

It is further particularity that the adjusting mechanism also serves for the balancing. This is achieved by constructing the pistons such that the centres of gravity of the coupled pistons 52 and 56 are situated on the same side of the centre line of the shaft 39 as the coupling of the said pistons with the plate 37; their common centre of gravity is situated in the central plate 61 of the plate 37, while the pistons 55 and 58 have the same mass as the pistons 52 and 56; also the overall centre of gravity of the pistons 55 and 58 is situated in the central plane 61. As a result, in the situation shown in FIG. 1, the rotary forces of pistons 52, 56 and 55, 58 cancel each other, so that no torque is exerted on the shaft 39.

When liquid is introduced into the spaces 57 and 59 and the pistons move away from each other, a torque will be exerted. The value of this torque increases as the distance between the pistons 52, 56 and 55, 58 increases, and hence as the angle enclosed by the plate 37 and the horizontal plane increases. As the inclination of the plate 37 increases, the mass inertia forces of the reciprocating parts (pistons 1, 2, 3 and 4, drive rods 9, 10, 11, 12 and drive rod heads 32) also increase, so that the mass inertia forces can be balanced by a suitable choice of the masses of the pistons 52, 56 and 55, 58 with respect to these reciprocating parts. However, as is graphically shown in FIGS. 6a and 6b, the balancing torques (line 2) increase in proportion to the sine of the angle $\beta$ between the plate and shaft as the plate is tilted, while the mass inertia torque (line 1) increases in proportion to $\sin \beta \cdot \cos \beta = \frac{1}{2} \sin 2\beta$. Generally, proper balancing can be achieved, notably for small adjusting angles $\beta$.

Figure 6:
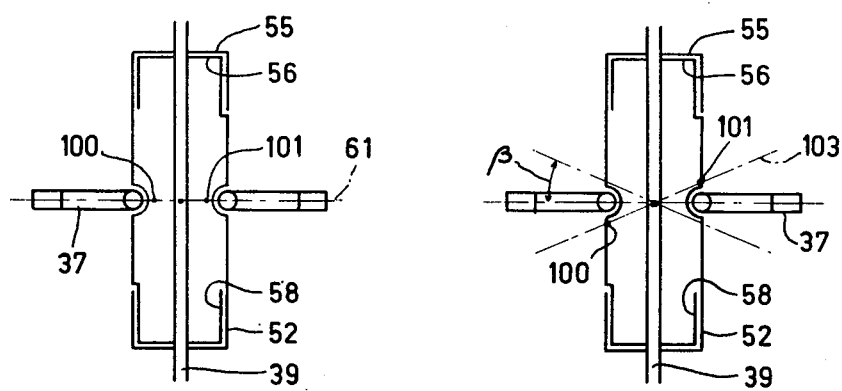
FIGS. 6a and 6b are diagramatic views of hot gas engines and corresponding graphs of the balancing torques and mass inertia torque or a function of the angle B enclosed by the swash plate and the shaft.
Figure 6:
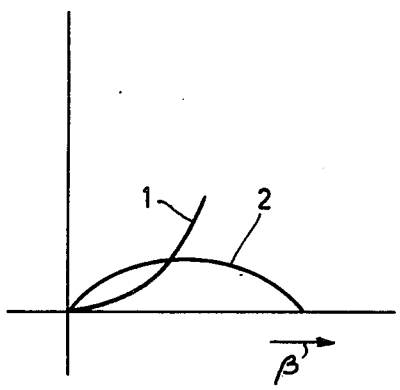
Figure 6:
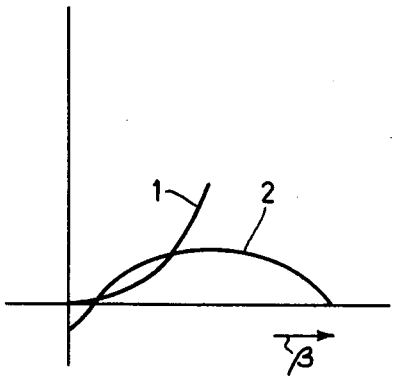

If the proportions are chosen such that, like in FIG. 6a, the two overall centres of gravity 100 and 101 of the parts of the plate and the adjusting members situated on both sides of the tilting axis are situated in one plane 61 which is perpendicular to the shaft at $\beta = 0$, i.e. in the perpendicular position of the plate with respect to the shaft, complete balancing will occur. As the angle increases, the mass inertia torques (line 1) as well as the balancing torque (line 2) increase, be it to a slightly different extent. This is illustrated in FIG. 6a. It is alternatively possible to choose the proportions, like in FIG. 6b, such that at $\beta = 0$ the said overall centres of gravity 100 and 101 are situated in a plane 103 which encloses an angle 8 with the plane perpendicular to the shaft which is situated on the same side as on which the adjusting angle $\beta$ is situated. This means that at $\beta = 0$ the torque (line 2) is not zero. Upon adjustment, the torque first decreases, even becomes zero, and subsequently increases. In given circumstances this may give rise to an imbalance which is less than in the described construction, because the masses can then be chosen such that the line 2 of the balancing torque intersects the line 1 of the unbalanced forces twice, so that the means deviation of these two lines can be smaller than in the case shown in FIG. 6a.

Even though the drive mechanism was described with reference to a hot-gas engine, it will be obvious that such a mechanism can also be used in other devices including reciprocating pistons, such as pumps, compressors, etc.

Figure 5:
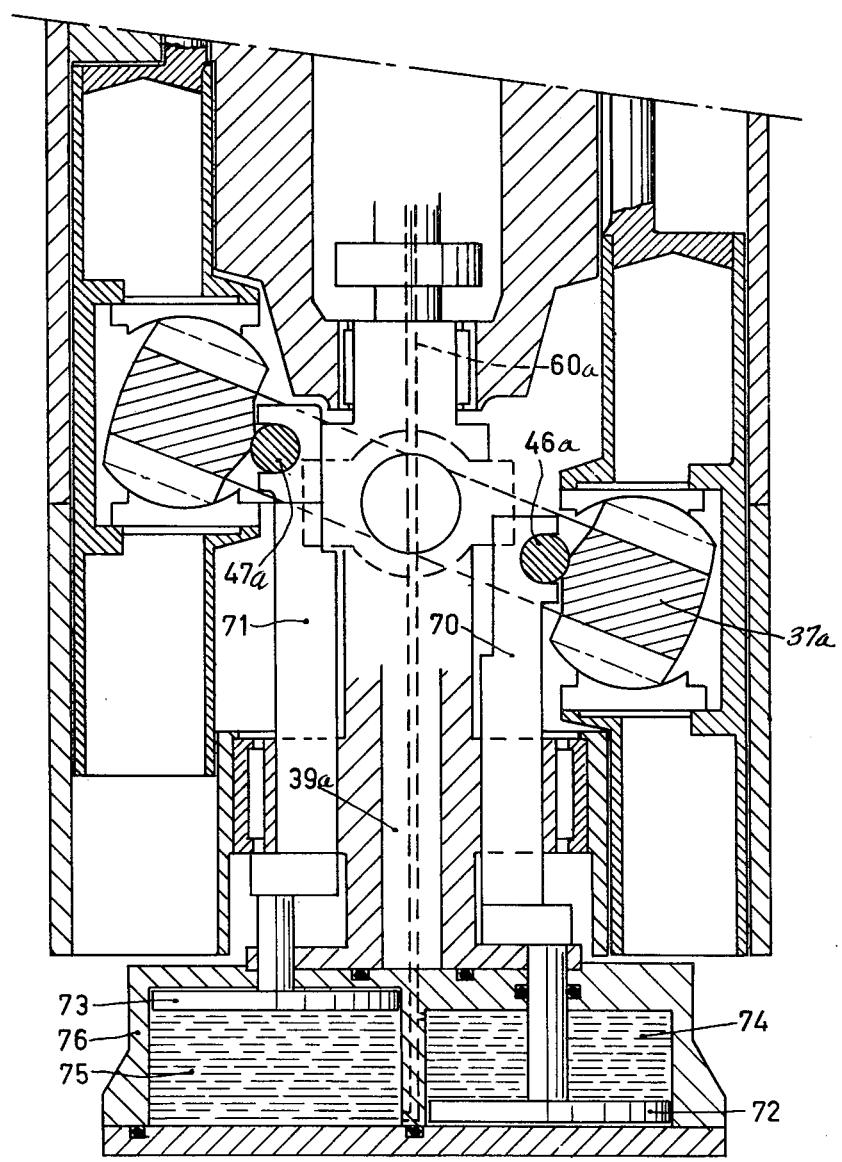
FIG. 5 is a fragmentary elevation view in section of a second embodiment of the invention.

FIG. 5 is a diagrammatic sectional view of a further embodiment of the drive section of the device shown in the preceding Figures. All corresponding parts are denoted by corresponding references plus the suffix $a$ in this Figure. The plate 37a herein is coupled, by way of two pin-slot couplings 46 and 47, to two piston rods 70 and 71 which are connected to two pistons 72 and 73 accommodated in cylinders 74 and 75 provided in a structural part 76 which is connected to the shaft 39a. Via duct 60a in the shaft 39a, liquid pressure can again be applied to the spaces 74 and 75. The position of the plate 37a can again be determined by applying more or less oil. Because the pistons 72 and 73 are provided on both sides of the shaft 39a, in a tilted position of the plate 37a, i.e. in which the pistons 72 and 73 have been axially shifted with respect to each other, a torque will occur which balance the mass inertia forces if suitable proportions are chosen.

What is claimed is:

1. A device, notably a hot-gas reciprocating machine, comprising at least three reciprocating drive pistons, each of which is provided with a drive rod which cooperates, via a drive rod head incorporating sliding bodies, with a plate which is mounted on a shaft, said shaft being rotatably journalled in the device said plate being mounted on the shaft in a manner to allow it to perform only a rotary movement together with the shaft, means for tilting the plate about a tilting axis which is transverse to the center line of the shaft characterized in that the means for tilting the plate comprises a first and a second piston which rotate with the shaft and which are reciprocable in the axial direction of the shaft, first means for coupling the first said control piston to the plate on one side of the center line of the shaft, second means for coupling the second control piston to the plate on the other side of the center line of the shaft said control pistons cooperating to define a space therebetween whereto liquid can be applied under pressure, each of the control pistons having a center of gravity which is situtated on the same side of the plane through the center line of the shaft and the tilting axis as the coupling between the said control piston and the plate, the overall center of gravity of said first of said control pistons and the part of the plate which is situated on said one side of the center line of the shaft and the overall center of gravity of said second of said control pistons and the part of the plate which is situated on said second side of the center line of the shaft in the situation wherein the plate is perpendicular to the center line of the shaft, both being situated in a plane which is either perpendicular to the center line of the shaft or which encloses an angle with said plane perpendicular to the center line of the shaft, said angle being situated on the side of said plate other than the side on which the angle over which the plate can be adjusted with respect to the plane perpendicular to the center line of the shaft through the tilting axis is situated.

2. A device as claimed in claim 1, characterized in that the control pistons are arranged to be slidable on the shaft on both sides of the plate, each control piston being constructed such that the center of gravity of each control piston is situated on the same side of the tilting axis as the coupling between the relevant control piston and the plate, each of the control pistons further including a weight which is situated on the side of the plate other than the side on which the relevant control piston is situated.

3. A device as claimed in claim 2, characterized in that each of the said weights is also constructed as a piston which is slidable on the shaft and which encloses, in conjunction with the control piston which is situated on the same side of the plate, a space whereto and wherefrom liquid can be applied and discharged.

4. In a machine having a wobble-plate drive mechanism, the machine including at least three reciprocating drive pistons and a drive rod extending axially from each of said pistons, the drive mechanism including a central drive shaft rotatable about its axis, a wobble-plate mounted on said shaft, said plate defining a plane transverse of the shaft axis and tiltable relative to said axis, said plate being fixed to rotate only with said shaft, said drive rods each having an end slidably engaging said plate, whereby the angle of tilt of the plate corresponds to the stroke of said drive pistons, and control means for tilting said plate, the improvement in combination therewith, wherein said control means comprises two pairs of first and second axially-spaced control pistons, the two control pistons of each pair being coaxially mounted on said shaft and being axially movable relative to said shaft axis and to each other, said control pistons of each pair having adjacent and axially spaced control surfaces defining and bounding a variable volume closed control space, said control means further comprising a source of fluid under pressure, duct means for flowing said fluid into said control spaces for driving said control pistons of each pair axially apart, and two coupling means, each coupling means pivotally connecting the control pistons of one of said pairs with said plate, said two coupling means spaced generally 180° apart around said shaft axis, whereby movement of said control pistons axially apart moves said two coupling means axially apart, thereby tilting said plate; each of said pairs of control pistons having a center of gravity located along the axis of said central shaft and respectively on opposite sides of said plate.

* * * * *

UNITED STATES PATENT AND TRADEMARK OFFICE
CERTIFICATE OF CORRECTION

PATENT NO. : 4,030,404
DATED : June 21, 1977
INVENTOR(S) : Roelf Jan Meijer

It is certified that error appears in the above-identified patent and that said Letters Patent are hereby corrected as shown below:

Col. 5, line 64, "8" should be --$\beta$--

Col. 6, Claim 1, line 41, after "shaft" insert --,-- line 43, after "second" insert --control-- line 48, after "shaft" insert --,--

Signed and Sealed this

Eighth Day of November 1977

[SEAL]

Attest:

RUTH C. MASON
*Attesting Officer*

LUTRELLE F. PARKER
*Acting Commissioner of Patents and Trademarks*